UNITED STATES PATENT OFFICE.

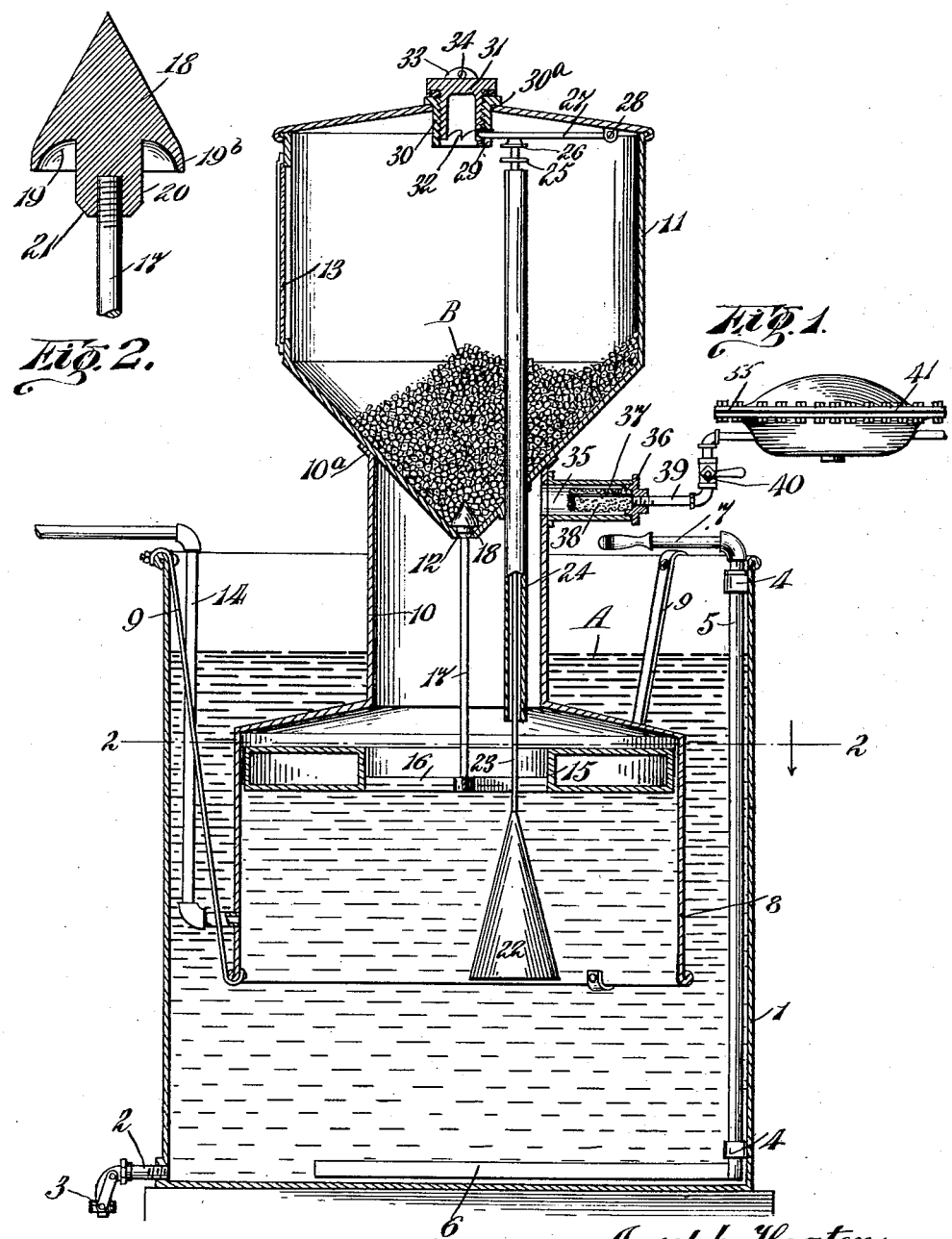

JOSEPH HEATON, OF HAMPTON STATION, NEW BRUNSWICK, CANADA.

ACETYLENE-GAS GENERATOR.

No. 886,699.  Specification of Letters Patent.  Patented May 5, 1908.

Application filed November 7, 1906. Serial No. 342,341.

*To all whom it may concern:*

Be it known that I, JOSEPH HEATON, a subject of the King of Great Britain, residing at Hampton Station, county of Kings, in the Province of New Brunswick, Canada, have invented certain new and useful Improvements in Acetylene-Gas Generators; and I do hereby declare that the following is a full, clear, and exact description of the invention, such as will enable others skilled in the art to which it appertains to make and use the same.

My invention relates to acetylene generators.

The object of my invention is to provide a generator of few movable parts and of simple construction.

A more specific object is to provide a carbid feed which is certain in its action and which will not clog.

A further object is to provide a construction in which a movable gas dome is rendered unnecessary by utilizing the pressure of a column of water.

A further object is to provide a simple removable scrubbing device.

A further object is to provide a pressure regulating chamber attached direct to the generator.

A further object is to provide a safety device adapted to cut off the carbid feed in case of fire; and, my invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a vertical central section through the generator and carbid receptacle; and Fig. 2 is a vertical section through the head of a carbid feed controlling rod.

Referring to the drawings, 1 designates a tank, having adjacent its lower wall a decanting pipe 2, and the pipe has thereon a closure 3. Secured to the inner face of the vertical wall of the tank 1, is a plurality of straps 4, in which is rockably disposed a vertical rod 5, having at its lower end a horizontally disposed agitating arm 6, and having a handle 7 on its upper end, by means of which the spent carbid at the bottom of the tank 1 may be agitated.

Disposed within the tank 1 is a gas dome 8, having secured to its lower edge the lower ends of the straps 9, the upper ends of which are securely bolted to the upper edge of the tank 1, so that the dome is rigidly held against movement. The dome 8 is provided with a reduced upper end 10, having a flange 10ª, on which is disposed the carbid receptacle 11, having an opening 12 in its bottom. As shown, the lower portion of the carbid chamber has an inclined bottom, which extends within the reduced portion 10 of the dome. The vertical wall of the carbid receptacle 11 is provided with a transparent section 13, by means of which the contents of the receptacle may be observed.

A safety escape pipe 14 is connected to the dome 8 adjacent its lower edge, and extends, in actual use, outside of the building in which the generator is installed. The point of connection of the escape pipe 14 with the gas dome is just above the safety line of movement of a float which controls the supply of carbid. In case of breakage, or over production of gas, whereby the float is forced downward so that gas might escape beneath the lower edge of the dome and from thence into the building, gas would not escape under the edge of the dome, but would escape through the safety pipe 14.

Disposed in the dome 8 is an annular hollow float 15, carrying a spider 16, to which is connected the rod 17, projecting through the opening 12 of the carbid chamber.

Carried by the upper end of the rod 17, is a conical head 18, having a concave annular recess 19 in its under surface, and having the nearly vertical face 19ᵇ at the periphery of its base. The head is provided with a shank 20, having the beveled lower face 21. The head 18 projects into the body of carbid B, and its conical portion affords little resistance to its movement through said body. The vertical face 19ᵇ readily permits the carbid to pass the head, and when the head 18 is depressed by movement of the float 15, the concave channel 19 does not retain any of the carbid between it and the inclined bottom of the carbid receptacle, so that the beveled face 21 is closely seated against the inclined bottom of the carbid receptacle, and thereby stops the feed of the carbid. The head 18 being carried by screw-threaded engagement with the rod 17, the parts are readily separable for the purposes of renewal and repair.

Disposed in the dome 8 is a float 22, to which is secured a rod 23 extending upwardly through a tube 24, which is carried by the carbid chamber 11. A washer 25 is secured on the rod 23, and is adapted to contact with the upper end of the tube 24 to limit the downward movement of the rod 23. Secured to the upper end of the rod 23 is a button 26, adapted to contact with the lever 27, which is pivoted at 28, and one end of which works in and is guided by a slot 29 formed in the wall of an interiorly screw-threaded collar 30, which forms part of the closure for the charging opening 30$^a$ in the upper wall of the carbid receptacle 11. A tubular plug 31 is placed in screw-threaded engagement with the collar 30, and is provided with teeth 32 on the lower edge of its wall. The teeth 32 are inclined, so that the plug 31 may be screwed downward into engagement with the collar 30, and its teeth will ride over the projecting end of the lever 27, but as long as there is a body of water A within the tank 1 at the height of the lower edge of the gas dome 8, the screw-threaded plug 31 can not be unscrewed because of the engagement of the lever 27 with the teeth 32. When the water is decanted, the float 22 will drop and withdraw the rod 23, so that the lever 27 is withdrawn from engagement with the teeth, and the plug 31 may be unscrewed, and the carbid receptacle recharged. The object of this is to make it necessary to decant the water and clean the apparatus before putting in a fresh charge of carbid. The plug 31 is provided with a lug 33 on its outer end, having an opening 34 therein adapted to receive an insertible instrument, by means of which the plug may be screwed into engagement with the collar 30.

A gas discharge conduit 35 is placed in connection with the upper end of the gas dome, and has its outer end closed by the screw-threaded plug 36, which carries an interiorly projecting bent arm 37, covered by a fabric 38, so that any gas which passes through the conduit must pass through the fabric, whereby the gas is scrubbed. A service pipe 39 is connected to the screw-threaded plug 36, and has thereon an ordinary form of valve 40.

As the dome 8 is fixed, and the pressure of the gas therein increases in proportion to its formation, it is necessary to have some kind of pressure regulator in order to secure the best results. Such regulating device as shown at 41 is placed on the service pipe 39.

Having thus fully described my invention, what I claim as new and desire to secure by Letters Patent, is:

1. A generator comprising a tank, a gas dome fixed within the tank, a carbid chamber on the dome provided with a charging opening, means for feeding the carbid from the chamber to the tank, a closure for the charging opening provided with teeth, a pivoted member arranged to engage the teeth of the closure, and means for maintaining the pivoted member in engagement with the teeth.

2. A generator comprising a tank, a gas dome fixed within the tank, a carbid chamber carried by the dome and provided with a charging opening, means for feeding carbid from the chamber to the tank, a closure disposed within the charging opening and provided with teeth, a pivoted member arranged to engage the teeth of the closure, a rod adapted to contact with the pivoted member, a float secured to the rod, means for guiding the rod, and means for limiting the downward movement of the rod.

3. A generator comprising a tank, a gas dome fixed within the tank, a carbid chamber carried by the dome and provided with a charging opening, means for feeding carbid from the chamber to the tank, a closure disposed within the charging opening and provided with teeth, a pivoted member arranged to engage the teeth of the closure, a rod adapted to contact with the pivoted member, a float secured to the rod, a tubular member carried by the carbid chamber in which the rod is disposed, and means for limiting the downward movement of the rod.

4. A generator comprising a tank, a gas dome fixed within the tank, a carbid chamber carried by the dome and provided with a charging opening, means for feeding carbid from the chamber to the tank, a closure disposed within the charging opening and provided with teeth, a pivoted member arranged to engage the teeth of the closure, a rod adapted to contact with the pivoted member, a float secured to the rod, a tubular member carried by the carbid chamber in which the rod is disposed, and a washer on the rod arranged to contact with the upper end of the tubular member.

5. A generator comprising a tank, a gas dome fixed within the tank, a carbid chamber connected to the dome and provided with a charging opening, an interiorly screw-threaded sleeve fixed within the opening and provided with a slot, an exteriorly screw-threaded closure disposed in the sleeve, pivoted means adapted to lock the closure in the sleeve, which means is disposed in and is adapted to be guided by the wall of said slot, and means for feeding carbid from the chamber into the tank.

6. In a generator, the combination comprising a carbid chamber having an inclined bottom with an opening therein, a rod disposed through the opening, a conical head provided with a vertical periphery and with a concave channel on its under side, and provided with a shank having a beveled surface and in screw-threaded engagement with the rod.

7. A generator comprising a tank, a gas dome fixed within the tank, a carbid chamber on the dome provided with a charging opening, means for feeding the carbid from the chamber to the tank, a closure for the charging opening provided with teeth, a movable member adapted to engage the teeth of the closure, and means for maintaining said movable member in engagement with the teeth.

8. A generator comprising a tank, a gas dome fixed within the tank, a carbid chamber carried by the dome and provided with a charging opening, means for feeding the carbid from the chamber to the tank, a closure disposed within the charging opening and provided with teeth, a movable member adapted to engage the teeth of the closure, a rod adapted to contact with the movable member, a float secured to the rod, means for guiding the rod, and means for limiting the downward movement of the rod.

9. A generator comprising a tank, a gas dome fixed within the tank, a carbid chamber carried by the dome and provided with a charging opening, means for feeding carbid from the chamber to the tank, a closure disposed within the charging opening and provided with teeth, a movable member adapted to engage the teeth of the closure, a rod adapted to contact with the movable member, a float secured to the rod, a tubular member carried by the carbid chamber in which said rod is disposed, and means for limiting the downward movement of the rod.

10. A generator comprising a tank, a gas dome fixed within the tank, a carbid chamber carried by the dome and provided with a charging opening, means for feeding carbid from the chamber to the tank, a closure disposed within the charging opening and provided with teeth, a movable member arranged to engage the teeth of the closure, a rod adapted to contact with the movable member, a float secured to the rod, a tubular member carried by the carbid chamber in which said rod is disposed, and a washer on the rod arranged to contact with the upper end of the tubular member to thereby limit the downward movement of the rod.

11. In a generator, the combination comprising a carbid chamber, provided with an opening therethrough, a rod disposed through the opening, a conical head provided with a vertical periphery and connection between said rod and head whereby said head may be operated.

In witness whereof I have hereunto set my hand in the presence of two witnesses.

JOSEPH HEATON.

Witnesses:
GIFFORD WILLRICH,
L. M. JEWETT.